US010432556B1

(12) United States Patent
Pannell

(10) Patent No.: US 10,432,556 B1
(45) Date of Patent: *Oct. 1, 2019

(54) ENHANCED AUDIO VIDEO BRIDGING (AVB) METHODS AND APPARATUS

(71) Applicant: Marvell International Ltd., Hamilton (BM)

(72) Inventor: Donald Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 46 days.

This patent is subject to a terminal disclaimer.

(21) Appl. No.: 15/888,690

(22) Filed: Feb. 5, 2018

Related U.S. Application Data

(63) Continuation of application No. 15/425,401, filed on Feb. 6, 2017, now Pat. No. 9,887,938, which is a continuation of application No. 13/115,865, filed on May 25, 2011, now Pat. No. 9,565,035.

(60) Provisional application No. 61/348,693, filed on May 26, 2010.

(51) Int. Cl.
*H04L 12/931* (2013.01)
*H04L 12/863* (2013.01)
*H04L 12/935* (2013.01)
*H04L 12/741* (2013.01)
*H04L 12/28* (2006.01)

(52) U.S. Cl.
CPC .......... *H04L 49/354* (2013.01); *H04L 45/745* (2013.01); *H04L 47/6215* (2013.01); *H04L 49/3027* (2013.01); *H04L 12/28* (2013.01)

(58) Field of Classification Search
CPC . H04L 49/354; H04L 45/745; H04L 47/6215; H04L 49/3027; H04L 12/28
See application file for complete search history.

(56) References Cited

U.S. PATENT DOCUMENTS

| 5,953,019 A | 9/1999 | Shimakawa et al. |
| 6,052,683 A | 4/2000 | Irwin |
| 6,377,782 B1 | 4/2002 | Bishop et al. |
| 6,510,138 B1 | 1/2003 | Pannell |

(Continued)

FOREIGN PATENT DOCUMENTS

WO    WO-2013/017017    2/2013

OTHER PUBLICATIONS

"Hopscotch Hashing," *Wikipedia* entry downloaded from http://en.wikipedia.org/wiki/Hopscotch_hashing on Oct. 6, 2014 (3 pages).
Demetriades et al., "An Efficient Hardware-based Multi-hash Scheme for High Speed IP Lookup," 2008 16th IEEE Symposium on High Performance Interconnects, Aug. 2008 (8 pages).

(Continued)

*Primary Examiner* — Walter J DiVito

(57) ABSTRACT

A network device determines that a frame priority of a received frame is a value corresponding to an audio video bridging (AVB) communication protocol. When the network device determines that a destination address of the frame is not included in a database having network addresses, the network device prevents the frame from being transmitted according to the AVB communication protocol, including either (i) dropping the frame, or (ii) transmitting the frame only from a first set of one or more ports of the network device according to a communication protocol that is different than the AVB communication protocol. When the network device determines that the frame is permitted to be transmitted according to the AVB communication protocol, the network device transmits the frame from a second set of one or more ports according to the AVB communication protocol.

24 Claims, 10 Drawing Sheets

(56) References Cited

U.S. PATENT DOCUMENTS

| | | |
|---|---|---|
| 6,816,489 B1 | 11/2004 | Patra et al. |
| 6,819,653 B1 | 11/2004 | Hodgins et al. |
| 6,987,770 B1 | 1/2006 | Yonge, III |
| 7,035,273 B1 | 4/2006 | Pannell et al. |
| 7,110,415 B1 | 9/2006 | Walsh et al. |
| 7,209,440 B1 | 4/2007 | Walsh et al. |
| 7,457,297 B2 | 11/2008 | Woo et al. |
| 9,171,030 B1 | 10/2015 | Arad et al. |
| 9,237,100 B1 | 1/2016 | Mizrahi et al. |
| 9,565,035 B1 | 2/2017 | Pannell |
| 9,565,118 B1 | 2/2017 | Pannell |
| 9,584,342 B1 | 2/2017 | Pannell |
| 9,590,910 B1 | 3/2017 | Pannell |
| 9,887,938 B1 | 2/2018 | Pannell |
| 2002/0087723 A1 | 7/2002 | Williams et al. |
| 2005/0027837 A1 | 2/2005 | Roese et al. |
| 2005/0054370 A1 | 3/2005 | Shpak |
| 2005/0220105 A1 | 10/2005 | Yen et al. |
| 2005/0281235 A1 | 12/2005 | Beach et al. |
| 2007/0153802 A1 | 7/2007 | Anke et al. |
| 2008/0037567 A1 | 2/2008 | Cho et al. |
| 2008/0112433 A1 | 5/2008 | Feng et al. |
| 2008/0114887 A1 | 5/2008 | Bryers et al. |
| 2008/0123531 A1 | 5/2008 | Gerkis |
| 2008/0212591 A1 | 9/2008 | Wu et al. |
| 2008/0285574 A1 | 11/2008 | Teener |
| 2008/0288638 A1 | 11/2008 | Diab et al. |
| 2009/0016217 A1 | 1/2009 | Kashyap |
| 2009/0031044 A1 | 1/2009 | Barrack et al. |
| 2009/0049175 A1 | 2/2009 | Finn |
| 2009/0160943 A1 | 6/2009 | Badt, Jr. et al. |
| 2009/0180389 A1 | 7/2009 | Mack-Crane et al. |
| 2009/0201844 A1 | 8/2009 | Bhatti et al. |
| 2010/0110898 A1 | 5/2010 | Effenberger et al. |
| 2010/0122098 A1 | 5/2010 | Kay |
| 2010/0220724 A1 | 9/2010 | Rabie et al. |
| 2010/0238836 A1 | 9/2010 | Diab et al. |
| 2011/0029676 A1 | 2/2011 | Detrick et al. |
| 2011/0044226 A1 | 2/2011 | Song et al. |

OTHER PUBLICATIONS

Herlihy et al., "Hopscotch Hashing," *DISC '08 Proceedings of the 22nd International Symposium on Distributed Computing*, pp. 350-364 (Sep. 22, 2008).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE Std 802.1Q-2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

Peng et al., "Content-Addressable memory (CAM) and its network applications," International IC—Taipei Conference Proceedings, May 2000.

Raoof et al., Impact of Depolarization Effects on MIMO Polarized Wireless Configuration, Wireless Communications, Networking and Mobile Computing, 2007. WiCom 2007, Sep. 21-25, 2007, pp. 1-4.

Shavit, "Hopscotch Hashing," PowerPoint Presentation downloaded from http://www.velox-project.eu/sites/default/files/Hopscotch%20Hashing%20talk%20slides.ppt on Oct. 6, 2014 (50 slides).

Thaler et al., "Multipath Issues in Unicast and Multicast Next-Hop Selection," The Internet Society, 2000, 10 pages.

U.S. Appl. No. 61/695,520, "Efficient TCAM Architecture," filed Aug. 31, 2012 (Levi, et al.).

U.S. Appl. No. 14/657,898, filed Mar. 13, 2015.

554
USE HEADER INFORMATION TO RETRIEVE FROM DATABASE INFORMATION INDICATING WHETHER PACKET SHOULD BE ENQUEUED AS IF AN AVB PACKET AND INFORMATION INDICATING WHETHER PRIORITY INDICATOR FIELD IN HEADER CAN BE MODIFIED

558 TREAT AS AVB? — NO → END
YES ↓

562 OK TO MODIFY PRI? — NO → END
YES ↓

566 SET VARIABLE TO INFORM QUEUE CONTROLLER THAT PACKET IS TO BE ENQUEUED AS IF AN AVB PACKET

570 MODIFY PRIORITY INDICATOR FIELD IN HEADER ACCORDING TO VALUE FROM DATABASE

END

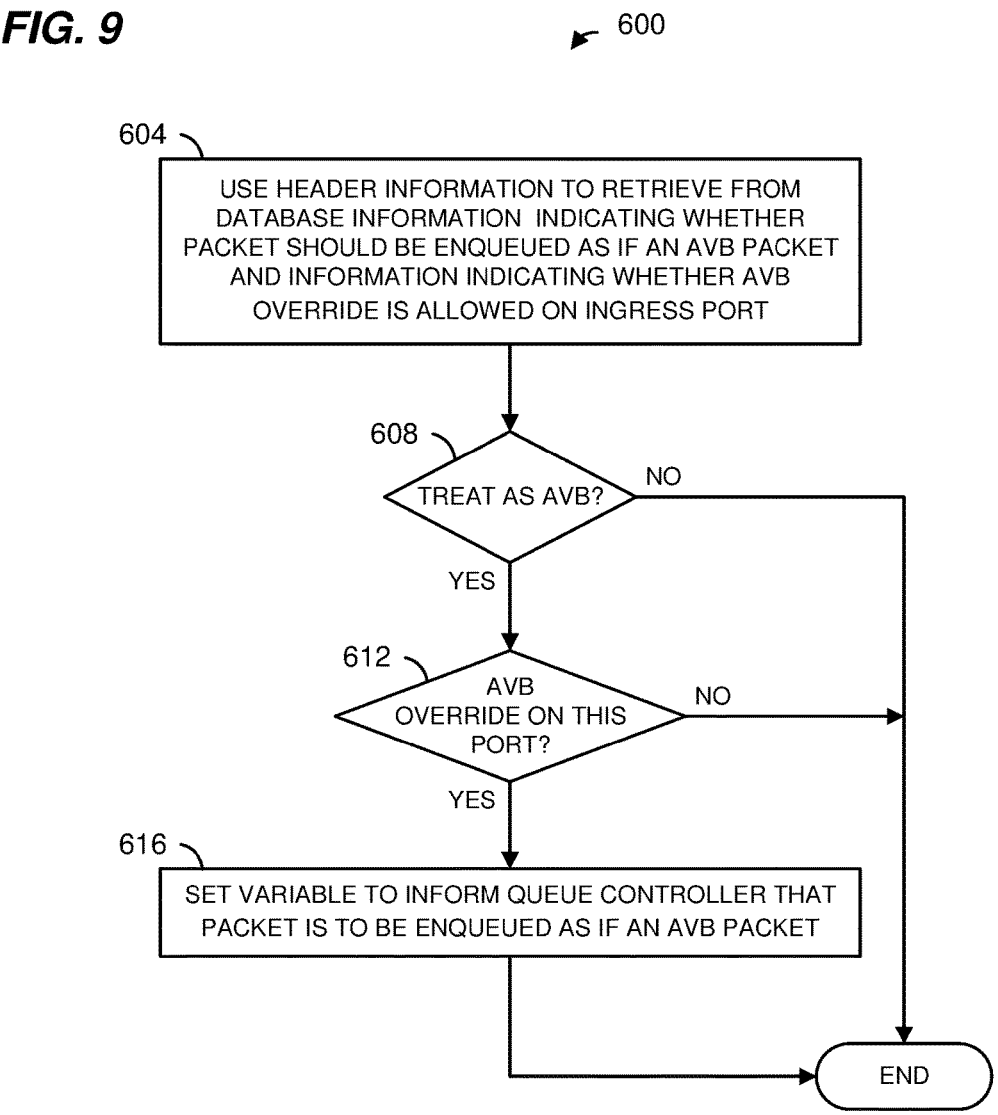

ENHANCED AUDIO VIDEO BRIDGING (AVB) METHODS AND APPARATUS

CROSS-REFERENCES TO RELATED APPLICATIONS

This application is a continuation of U.S. patent application Ser. No. 15/425,401 (now U.S. Pat. No. 9,887,938), entitled "ENHANCED AUDIO VIDEO BRIDGING (AVB) METHODS AND APPARATUS," filed on Feb. 6, 2017, which is a continuation of U.S. patent application Ser. No. 13/115,865 (now U.S. Pat. No. 9,565,035), entitled "ENHANCED AUDIO VIDEO BRIDGING (AVB) METHODS AND APPARATUS," filed on May 25, 2011, which claims the benefit of U.S. Provisional Patent Application No. 61/348,693, entitled "AUDIO VIDEO BRIDGING POLICY ENHANCEMENTS," filed on May 26, 2010. All of the applications referenced above are hereby incorporated by reference herein in their entireties.

Additionally, this application is related to the following U.S. Patent Applications:
  U.S. patent application Ser. No. 13/115,670 (now U.S. Pat. No. 9,590,910), entitled "METHODS AND APPARATUS FOR HANDLING MULTICAST PACKETS IN AN AUDIO VIDEO BRIDGING (AVB) NETWORK," filed on May 25, 2011;
  U.S. patent application Ser. No. 13/115,868 (now U.S. Pat. No. 9,584,342), entitled "ENHANCED AUDIO VIDEO BRIDGING (AVB) METHODS AND APPARATUS," filed on May 25, 2011; and
  U.S. patent application Ser. No. 13/115,682 (now U.S. Pat. No. 9,565,118), entitled "METHODS AND APPARATUS FOR HANDLING MANAGEMENT PACKETS IN AN AUDIO VIDEO BRIDGING (AVB) NETWORK," filed on May 25, 2011.
All of the patent applications referenced above are hereby incorporated by reference herein in their entireties.

FIELD OF THE DISCLOSURE

The present disclosure relates generally to communication networks and, more particularly, to switch devices for handling low-latency streams.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Audio Video Bridging (AVB), is a set of standards developed and being developed by the Institute for Electrical and Electronics Engineers (IEEE) 802.1 working group with the intent of supporting real-time traffic, such as audio traffic and video traffic, with defined latencies and throughput, and guaranteed delivery.

This is a change in direction as compared to past communication network protocols, such as the IEEE 802.3 Ethernet standard and the IEEE 802.11 wireless local area network (WLAN) standards, that are designed to be 'best effort' protocols. 'Best effort' here means that there are no guarantees of delivery nor is the latency through the network reasonably definable. These older Ethernet and WLAN networks are allowed to drop (or discard) data at Layer 1 and/or Layer 2, and it is the responsibility of higher layer protocols in the protocol stack to insure reliable delivery of data by the re-transmission of the dropped portions. Such re-transmissions insure users get the full content of their e-mails and other file transfers, but the re-transmissions do not help when the data is time sensitive such as audio and/or video streams. Re-transmission cannot be done in these cases as the window of usage of the information has usually past (i.e., the re-transmitted data typically shows up too late to help).

A phone conversation is an example application that uses real-time audio. The quality of a phone connection is typically excellent when making a POTS (Plain Old Telephone System) call. However, the same call using via the Internet is generally not as good and may not be acceptable at the present day. This is because a POTS network guarantees enough bandwidth for each call with defined latencies. The Internet currently cannot provide such guarantees.

A goal of AVB is to support real-time data streams with defined latencies and guaranteed delivery, over Ethernet- and WLAN-type networks, while at the same time allowing the previous (and future) applications to continue functioning on these same networks.

Devices configured to operate according to AVB (AVB devices) periodically exchange timing information that allows both ends of a link to synchronize their time base reference clock very precisely. This precise synchronization allows synchronization of multiple streams and provides a common time base for sampling/receiving data streams at a source device and presenting those streams at the destination device with the same relative timing.

AVB utilizes stream reservations to help insure that an AVB stream can start (or be joined to) only if all the bridges in the path of the stream have sufficient resources to support the stream. Resources include available buffers and bandwidth of the links. Additionally, AVB reservations help insure that no more than 75% of a link's bandwidth (as a default) is used for AVB streams. This helps insure the applications of the network can continue to function as before.

AVB also utilizes stream shaping to define how AVB data should be transmitted in the absence of congestion. Traffic shaping is a process of smoothing out the traffic for a stream so that the packets making up the stream are evenly distributed in time. If traffic shaping is not done at sources and bridges, then packets of a stream tend to "bunch" into bursts of traffic that can overwhelm buffers in subsequent bridges, switches and other infrastructure devices. AVB implements traffic shaping using existing IEEE 802.1Q forwarding and priority mechanisms but also defines a particular relationship between priority tags and frame forwarding behavior at endpoints and bridges.

SUMMARY

In an embodiment, a method is implemented by a network device that supports an audio video bridging (AVB) communication protocol. The method includes: receiving, at a first port of the network device, a frame having (i) a header with a destination address and (ii) a frame priority indicator; determining, at the network device, that the frame priority indicator has, when the frame was received at the first port, a value flagging the frame as to be handled by the network device according to the AVB communication protocol; performing, at the network device, a lookup in a database that includes network addresses, including determining whether the destination address in the header of the frame is included in the database; when the network device determines that the destination address in the header of the frame is not included in the database, preventing the frame from being transmitted by any port of the network device according to the AVB communication protocol, including either (i) dropping, at the network device, the frame so that the frame is not transmitted by any port of the network device, or (ii) transmitting, by the network device, the frame only from a first set of one or more ports of the network device according to a communication protocol that is different than the AVB communication protocol; and when the network device determines, based on the lookup in the database, that the frame is permitted to be transmitted by the network device according to the AVB communication protocol, transmitting, by the network device, the frame from a second set of one or more ports of the network device according to the AVB communication protocol.

In another embodiment, a network device supports an audio video bridging (AVB) communication protocol. The network device comprises: one or more integrated circuit devices; a database implemented on the one or more integrated circuit devices, the database including network addresses; and a lookup engine implemented on the one or more integrated circuit devices, the lookup engine coupled to, or including, the database. The lookup engine is configured to: perform lookups in the forwarding database using header information of frames received by the network to device, including performing a lookup in connection with a frame received at a first port of the network device, and determining whether a destination address in a header of the frame is included in the database. The one or more integrated circuit devices are configured to: determine that a frame priority indicator in a header of a frame received at a first port of the network device has, when the frame was received at the first port, a value flagging the frame as to be handled by the network device according to the AVB communication protocol; when the lookup engine determines that the destination address in the header of the frame is not included in the database, prevent the frame from being transmitted by any port of the network device according to the AVB communication protocol, including either (i) dropping the frame so that the frame is not transmitted by any port of the network device, or (ii) transmitting the frame only from a first set of one or more ports of the network device according to a communication protocol that is different than the AVB communication protocol; and when the one or more integrated circuit devices determine, based on the lookup in the database, that the frame is permitted to be transmitted by the network device according to the AVB communication protocol, transmit the frame from a second set of one or more ports of the network device according to the AVB communication protocol.

BRIEF DESCRIPTION OF THE DRAWINGS

FIG. 8 is a flow diagram of another example method for processing non-AVB packets in a network device to enqueue the non-AVB packets as if AVB packets, according to another embodiment.

FIG. 9 is a flow diagram of another example method for processing non-AVB packets in a network device to enqueue the non-AVB packets as if AVB packets, according to another embodiment.

DETAILED DESCRIPTION

In embodiments described below, a network device such as a Layer-2 and/or Layer 3 switch/router/bridge device (referred to herein as a "switch" for convenience) is configured to operate according to the Audio Video Bridging (AVB) protocol being developed by the IEEE 802.1 working group. In various embodiments, the switch is configured to provide one or more enhancements that enable improved performance of the switch and/or network. Some of the enhancements enable improved performance when the switch operates in a network having non-AVB devices, i.e., devices that are not configured to operate according to the AVB protocol.

Figure 1:
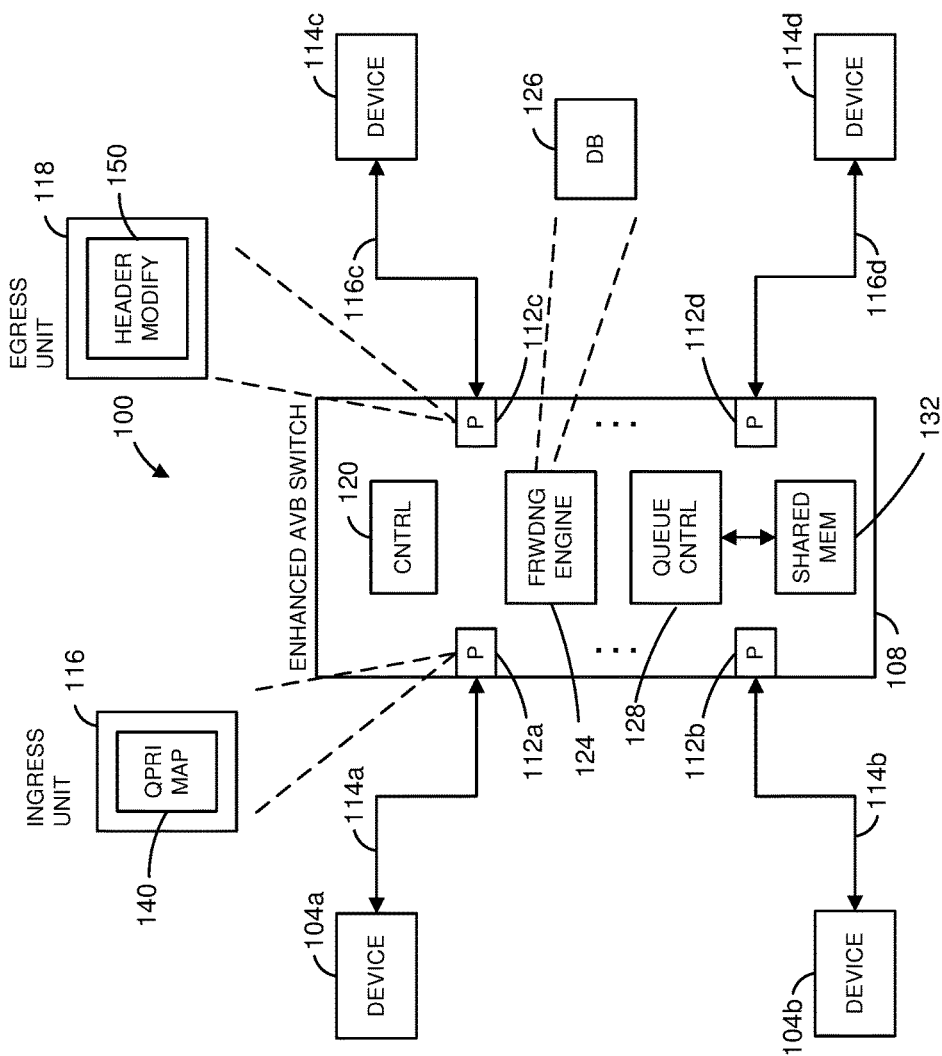
FIG. 1 is a block diagram of an example network 100 according to an embodiment.

FIG. 1 is a block diagram of an example network 100 according to an embodiment.

The network 100 includes a plurality of devices 104 communicatively coupled to a switch 108. The switch 108 (referred to herein as an "enhanced AVB switch") is configured to operate according to the AVB protocol and configured to provide one or more enhancements that enable improved performance of the switch 108 and/or network 100, in some embodiments.

The enhanced AVB switch 108 includes a plurality of ports 112. The plurality of devices 104 are communicatively coupled to the enhanced AVB switch 108 via the ports 112. For example, the device 104a is communicatively coupled to the port 112a; the device 104b is communicatively coupled to the port 112b, and so on. Although the enhanced AVB switch 108 is depicted in FIG. 1 as having at least four ports 112, the enhanced AVB switch 108 includes a different suitable number of ports in other embodiments. Although the network 100 is depicted in FIG. 1 as having four devices 104, the network 100 includes a different suitable number of devices 104 in other embodiments. Each device 104 is a suitable electronic device that sources data, is a destination of data sourced by another device 104, or forwards data. For example, the devices 104 may include one or more of desktop computers, laptop computers, smart phones, audio/visual equipment, network attached storage devices, printers, network switches, etc. Each device 104 is configured to transmit and receive packets via a respective communication link 114. Similarly, each port 112 is configured to transmit and received packets via the respective communication link 114.

In some embodiments and/or scenarios, a first set of one or more of the devices 104 are configured to operate according to the AVB protocol (referred to herein as "AVB devices"), whereas a second set of one or more of the devices 104 are not configured to operate according to the AVB protocol (referred to herein as "non-AVB devices"). In some embodiments, if an AVB device 104 is coupled to a port 112, the port 112 is configured to operate generally according to the AVB protocol (referred to sometimes herein as an "AVB port"). On the other hand, if a non-AVB device 104 is coupled to a port 112, the port 112 is not configured to operate according to the AVB protocol (referred to sometimes herein as a "non-AVB port"). In some embodiments, each port 112 is configured to determine whether the port 112 is coupled to an AVB device or a non-AVB device such as by communicating with the device 104 coupled to the port 112.

In an embodiment, each port 112 includes an ingress processing unit 116. The ingress processing unit 116 generally processes packets that ingress via the port 112. Similarly, in an embodiment, each port includes an egress processing unit 118. The egress processing unit 118 generally processes packets that egress via the port 112.

In an embodiment, the enhanced AVB switch 108 includes a controller 120 that configures the ports 112 to either operate generally according to the AVB protocol or not according to the AVB protocol. In an embodiment, the controller 120 includes a processor that executes machine readable instructions stored in a memory of, or coupled to, the controller 120 (not shown). The controller 120 is coupled to the ports 112. In an embodiment, the controller 120 is configured to determine whether a port 112 is coupled to an AVB device or a non-AVB device such as by communicating with the device 104 coupled to the port 112.

The enhanced AVB switch 108 also includes a forwarding engine 124 coupled to the ports 112 (coupling not shown in FIG. 1 for clarity). The forwarding engine 124 is configured to determine via which port or ports 112 a packet, which was received via one of the ports 112, should be transmitted. In some embodiments, the forwarding engine 124 analyzes data in a header of the packet to determine via which port or ports 112 the packet should be transmitted. For example, the forwarding engine 124 analyzes one or more of a destination address (unicast, multicast, or broadcast), a virtual local area network (VLAN) tag, etc., in the packet. The forwarding engine 124 includes a forwarding database 126 that stores forwarding information for different destination addresses (e.g., media access control (MAC) addresses, Internet Protocol (IP) addresses, VLANs, multicast addresses, etc.). In an embodiment, the forwarding engine 124 includes an address translation unit (ATU).

In an embodiment, the ingress units 116 of the ports 112 are coupled to the forwarding engine 124. For a port 112 via which a packet ingressed (an ingress port 112), the ingress port 112 utilizes forwarding information regarding the packet from the forwarding engine 124 to determine the port or ports 112 via which the packet is to be egressed (egress port(s) 112).

The enhanced AVB switch 108 also includes a queue controller 128 coupled to a shared memory 132. The queue controller 128 and the shared memory 128 are also coupled to the ports 112 (coupling not shown in FIG. 1 for clarity). When a packet is received via an ingress port 112, the ingress processing unit 116 of the ingress port 112 requests and receives one or more pointers from the queue controller 128. The ingress processing unit 116 then stores the packet at one or more buffers in the shared memory 132 that are indicated by the received pointers.

The ingress processing unit 116 interfaces with the forwarding engine 124 to determine the appropriate one or more ports 112 for egress (egress port(s)). The ingress processing unit 116 then sends the selected pointers and indications of the one or more egress ports(s) to the queue controller 128. The queue controller 128 then sends the pointers to the appropriate one or more egress port(s) 112. These egress port(s) 112 then retrieve the packet from the buffers indicated by the pointers and transmit the packet via respective links 116. These egress port(s) 112 then release the pointers for use by another incoming packet.

As will be described in more detail below, the ingress processing unit 116 includes a queue priority mapper 140 that generally determines a queue priority indicator that indicates an egress queue into which a packet should be placed, where different egress queues correspond to different priorities. Also as will be described in more detail below, the egress processing unit 118 includes a header modifier unit 150 that modifies a header of a packet before the packet is transmitted by the port 112 via the link 114.

Figure 2:
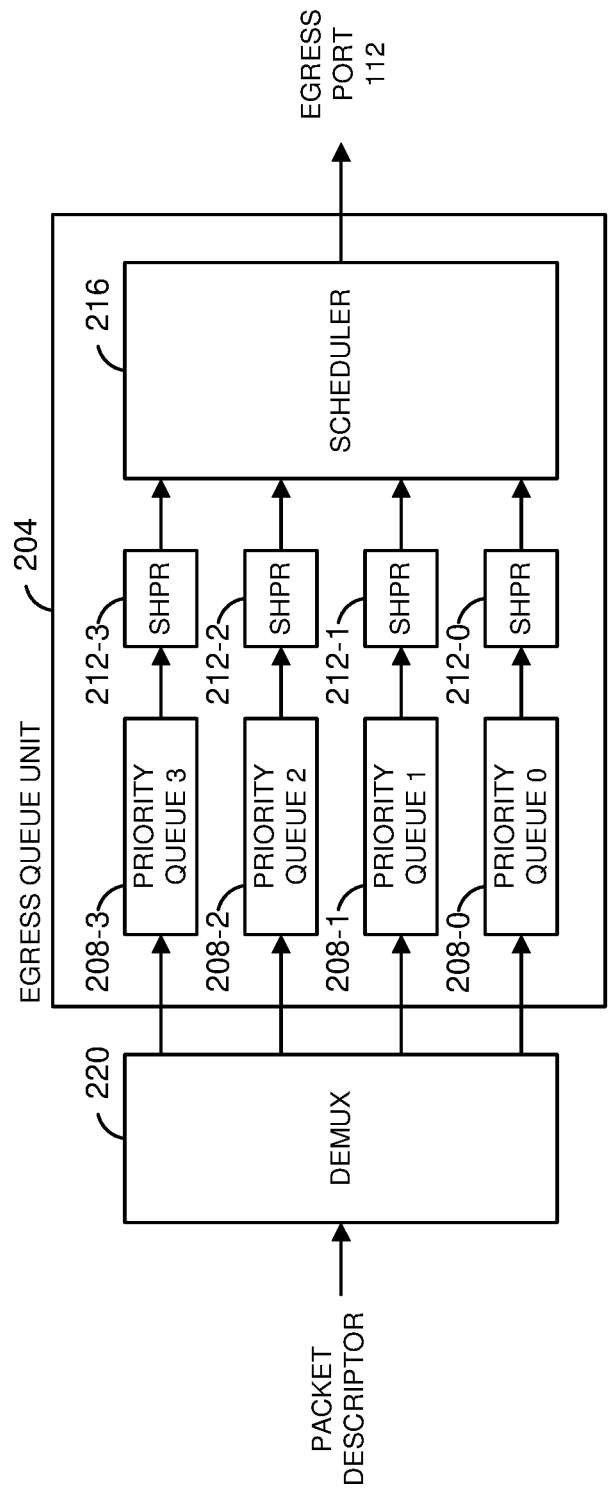
FIG. 2 is a block diagram of an example portion of a queue controller of FIG. 1, according to an embodiment.

FIG. 2 is a block diagram of an example portion 200 of the queue controller 128 of FIG. 1, according to an embodiment, and FIG. 2 will be described with reference to FIG. 1. The queue controller 128 includes a portion 200 for each port 112. The portion 200 includes an egress queue unit 204 coupled to the associated port 112. The egress queue unit 204 handles enqueuing packets for egress via the associated port 112.

More specifically, the egress queue unit 204 enqueues packet descriptors corresponding to packets and received from the forwarding engine 124. Each packet descriptor includes a pointer to a packet stored in one or more buffers in the shared memory 132. In some embodiments, the descriptor includes other information regarding the packet. For example, the descriptor includes a frame priority indicator associated with the packet, in an embodiment. The frame priority indicator indicates a priority assigned to the packet for transmission in the network and/or handling by the enhanced AVB switch, in an embodiment. The frame priority indicator is determined based on one or more of an IEEE 802.1p priority code point (PCP) field of an IEEE 802.1Q Standard VLAN tag in a header of the packet, a Differentiated Services Code Point (DSCP) field in an Internet Protocol (IP) header of the packet, an IP precedence field in the IP header, the port via which the packet was received, etc., in some embodiments. In another embodiment, the descriptor does not include the frame priority indicator.

The egress queue unit 204 includes a plurality of priority queues 208 corresponding to different priorities. In the example of FIG. 2, the egress queue unit 204 includes four priority queues 208 with priorities 3, 2, 1 and 0, where priority 3 is a highest priority and priority 0 is a lowest priority, in an embodiment. In other embodiments, another suitable number of priority queues 208 is utilized. Each queue 208 stores descriptors of packets to be transmitted from the egress port 112.

The egress queue unit 204 also includes a plurality of shaper units 212 coupled to the plurality of priority queues 208. In the example of FIG. 2, the egress queue unit 204 includes four shaper units 212 corresponding to the four priority queues 208, in an embodiment. In other embodiments, another suitable number of shaper units 212 is utilized. For example, in one embodiment, the shapers 212-0 and 212-1 are omitted. Each shaper unit 212 is configured to smooth out the traffic from the corresponding priority queue 208 so that the packets in the priority queue 208 making up a stream are evenly distributed in time.

A scheduler 216 is coupled to the egress port 112 and the priority queues 208 (via shaper units 212 in some embodiments). The scheduler 216 is configured to pass descriptors from the priority queues 208 to the egress port 112 in a manner such that precedence according to priority is given. In an embodiment, the scheduler 216 implements a strict priority queuing schemed. In other embodiments, other suitable weighting schemes are used, such as weighted fair priority queuing. According to weighted fair queuing, frames are processed so that over time, higher-priority frames are transmitted more often than lower-priority frames according to a predetermined weighting scheme and sequence. One example weighting scheme for four priorities is "8-4-2-1", in an embodiment. According to 8-4-2-1 weighting, in 15 consecutive time units, eight time units are allocated to priority 3, four time units are allocated to priority 2, two time units are allocated to priority 1, and one time unit is allocated to priority 0.

A demultiplexer unit 220 receives packet descriptors from the forwarding engine 124 and determines in which one of the priority queues 208 each packet descriptor should be placed. In an embodiment, the demultiplexer unit 220 analyzes a frame priority indictor of a packet and determines the appropriate priority queue 208 based on a priority indicator of the packet. For example, according to the AVB protocol, packets having an IEEE 802.1Q PCP field with a value 3 (as a default) should be placed in the priority queue 208-3; packets having an IEEE 802.1Q PCP field with a value 2 (as a default) should be placed in the priority queue 208-2; and, packets having an IEEE 802.1Q PCP field with a value other than 2 or 3 (as a default) should be placed in a priority queue with a lower priority than the priority queue 208-2 or the priority queue 208-3, e.g., in the priority queue 208-1 or the priority queue 208-0. The demultiplexer unit 220 then places the packet descriptor in the determined priority queue 208. According to the AVB protocol, a switch device can be configured so that packets having an IEEE 802.1Q PCP field with a value different than 3 are to be placed in the priority queue 208-3; and packets having an IEEE 802.1Q PCP field with a value different than 2 are to be placed in the priority queue 208-2.

In an embodiment, the demultiplexer unit 220 determines the appropriate priority queue 208 further based on whether the egress port 112 is coupled to an AVB device. For example, for a particular frame priority indicator, the demultiplexer unit 220 determines a first priority queue 208 when the egress port 112 is coupled to an AVB device and determines a second priority queue 208, different than the first priority queue 208 at least in some scenarios, when the egress port 112 is coupled to a non-AVB device, in an embodiment. As a specific example, for a frame priority indicator that corresponds to a IEEE 802.1Q PCP field with a value of three (as an example), the demultiplexer unit 220 determines the priority queue 208-3 when the egress port 112 is coupled to an AVB device and determines a priority queue 208 other than the priority queue 208-3, at least in some scenarios, when the egress port 112 is coupled to a non-AVB device, in an embodiment. As another specific example, for a frame priority indicator that corresponds to a IEEE 802.1Q PCP field with a value of two (as an example), the demultiplexer unit 220 determines the priority queue 208-2 when the egress port 112 is coupled to an AVB device 104 and determines a priority queue 208 other than the priority queue 208-2, at least in some scenarios, when the egress port 112 is coupled to a non-AVB device 104, in an embodiment.

In an embodiment, the portion 200 of the queue controller 128 corresponds to a particular port 112, and is configurable to operate in a first mode when the port 112 is communicatively coupled to a device that operates according to the AVB protocol. For example, when in the first mode, the portion 200 operates so that the queue 208-3 is treated as a Class A queue according to the AVB protocol, and the queue 208-2 is treated as a Class B queue according to the AVB protocol, in an embodiment. For instance, when in the first mode, the demultiplexer unit 220 places packets with a frame priority of value 3 (as an example) into the queue 208-3, places packets with a frame priority of value 2 (as an example) into the queue 208-2, and places packets with a frame priority of value other 2 or 3 (as an example) into the queue 208-1 or the queue 208-0, in an embodiment. In an embodiment, when in the first mode, the portion 200 operates so that packets enqueued in the queue 208-3 and the queue 208-2 are handled according to guaranteed delivery, a defined throughput, and/or a defined latency. On the other hand, when in the first mode, the portion 200 operates so that packets enqueued in the queue 208-1 and the queue 208-0, are handled with best effort delivery, in an embodiment. In an embodiment, the demultiplexer unit 220 is configurable so that the demultiplexer unit 220, in the first mode, places packets with an IEEE 802.1Q PCP field with a value different than 3 in the priority queue 208-3, and places packets having an IEEE 802.1Q PCP field with a value different than 2 in the priority queue 208-2.

In an embodiment, the portion 200 is also configurable to operate in a second mode when the port 112 associated with the portion 200 is communicatively coupled to a device that is not operating according to the AVB protocol. For example, when in the second mode, the demultiplexer unit 220 is not limited to placing packets with a frame priority of value 3 (as an example) into the queue 208-3, placing packets with a frame priority of value 2 (as an example) into the queue 208-2, and placing packets with a frame priority of value other 2 or 3 (as an example) into the queue 208-1 or the queue 208-0, in an embodiment. In an embodiment, when in the second mode, the portion 200 operates so that packets enqueued in the queues 208 are handled with best effort delivery.

Referring now to FIGS. 1 and 2, in an embodiment, each port 112 includes the queue priority mapper 140 as discussed above. The queue priority mapper 140, in an embodiment, determines a first queue priority indicator and a second queue priority indicator based on a frame priority indicator associated with the packet, such as corresponding to an IEEE 802.1p PCP field in an IEEE 802.1Q VLAN tag. In an embodiment, the queue priority mapper 140 determines the first queue priority indicator and the second queue priority indicator when the packet is received via an ingress port 112. Each of the first queue priority indicator and the second queue priority indicator is an indicator of the particular priority queue 208 in which the packet descriptor corresponding to the packet should be placed when the packet descriptor is passed to the queue controller 128 and is received by the demultiplexer unit 220 for transfer to the egress port 112. In an embodiment, the first queue priority indicator indicates the particular priority queue 208 in which the packet descriptor corresponding to the packet should be placed when the egress port 112 is coupled to an AVB device 104; and, the second queue priority indicator indicates the particular priority queue 208 in which the packet descriptor corresponding to the packet should be placed when the egress port 112 is coupled to a non-AVB device 104. The first queue priority indicator and the second queue priority indicator are associated with the packet and the descriptor of the packet. In an embodiment, first queue priority indicator and the second queue priority indicator are included in the descriptor. In some embodiments, first queue priority indicator and the second queue priority indicator are appended to, or otherwise associated with, the packet in the shared memory 132.

In an embodiment, when the packet descriptor corresponding to the packet is passed to the queue controller 128 and is received by the demultiplexer unit 220 for transfer to the egress port 112, the demultiplexer unit 220 determines the appropriate priority queue 208 based on the first queue priority indicator and the second queue priority indicator and whether the egress port 112 is coupled to an AVB device. For example, the demultiplexer unit 220 determines a first priority queue 208 based on the first queue priority indicator when the egress port 112 is coupled to an AVB device, and determines a second priority queue 208 based on the second queue priority indicator when the egress port 112 is coupled to a non-AVB device.

In some embodiments, each demultiplexer unit 220 includes a queue priority mapper 150 and the queue priority mappers 150 are omitted from the ports 112. When the packet descriptor corresponding to the packet is passed to the queue controller 128 and is received by the demultiplexer unit 220 for transfer to the egress port 112, the demultiplexer unit 220 determines the appropriate priority queue 208 based on the first queue priority indicator and the second queue priority indicator and whether the egress port 112 is coupled to an AVB device, as discussed above, according to an embodiment.

Figure 3:
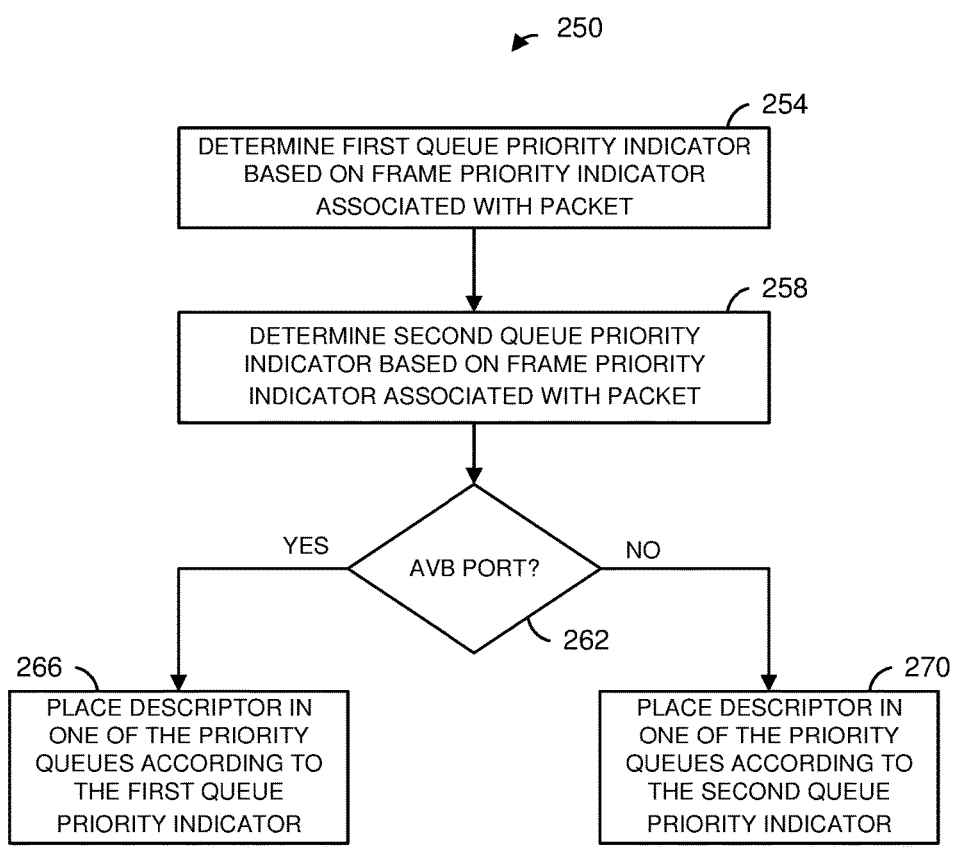
FIG. 3 is a flow diagram of an example method for placing a packet descriptor in an appropriate priority queue for egress, according to an embodiment.

FIG. 3 is a flow diagram of an example method 250 for placing a packet descriptor in an appropriate priority queue for egress, according to an embodiment. The method 250 is implemented by the enhanced AVB switch 108 (FIG. 1), in an embodiment. In other embodiments, the method 250 is implemented by another suitable switch device.

At block 254, a first queue priority indicator is determined based on a frame priority indicator associated with the packet, such as an indicator corresponding to an IEEE 802.1Q PCP field. At block 258, a second queue priority indicator is determined based on the frame priority indicator. At block 262, it is determined whether the port 112 via which the packet is to egress is coupled to an AVB device. Block 262 includes a suitable technique for determining if a port 112 is coupled to an AVB device.

If it is determined at block 262 that the port 112 via which the packet is to egress is coupled to an AVB device, the flow proceeds to block 266. At block 266, the descriptor is placed into an appropriate priority queue based on the first queue priority indicator. On the other hand, if it is determined at block 262 that the port 112 via which the packet is to egress is coupled to a non-AVB device, the flow proceeds to block 270. At block 270, the descriptor is placed into an appropriate priority queue based on the second queue priority indicator.

In some embodiments and scenarios, a received packet that is to be egressed via a plurality of ports 112 (e.g., a multicast packet or a broadcast packet), including AVB ports 112 and non-AVB ports, will be mapped to different priority queues 208 for different ports 112. As an illustrative example, a multicast packet is mapped to priority queue 208-1 for an AVB port 112, whereas the multicast packet is mapped to priority queue 208-3 for a non-AVB port 112.

In an embodiment, blocks 254 and 258 are implemented in the ingress processing unit 116 of the port 112 via which the packet ingressed. In an embodiment, blocks 262, 266, 270 are implemented in the egress queue unit 204 corresponding to each port 112 via which the packet is to egress. For example, in an embodiment, the demultiplexer unit 220 is configurable to use the first queue priority indicator to place the packet descriptor into the appropriate priority queue even when the egress port 112 is a non-AVB port. This can utilized to enable AVB traffic to exit the non-AVB port 112, which will be discussed in more detail below.

In an embodiment, a queue priority override field for the port 112 is set to a first value to indicate that the descriptor should placed into an appropriate priority queue based on the first queue priority indicator when the port is coupled to a non-AVB device, and the queue priority override field for the port 112 is set to a second value to indicate that the descriptor should placed into an appropriate priority queue based on the second queue priority indicator when the port is coupled to a non-AVB device. The queue priority override field for the port 112 is stored in a register or other suitable memory storage device, such as a random access memory (RAM), in an embodiment. The memory storage device is included in the port 112, in the queue controller, or another suitable location in the enhanced AVB switch, in an embodiment.

Figure 4:
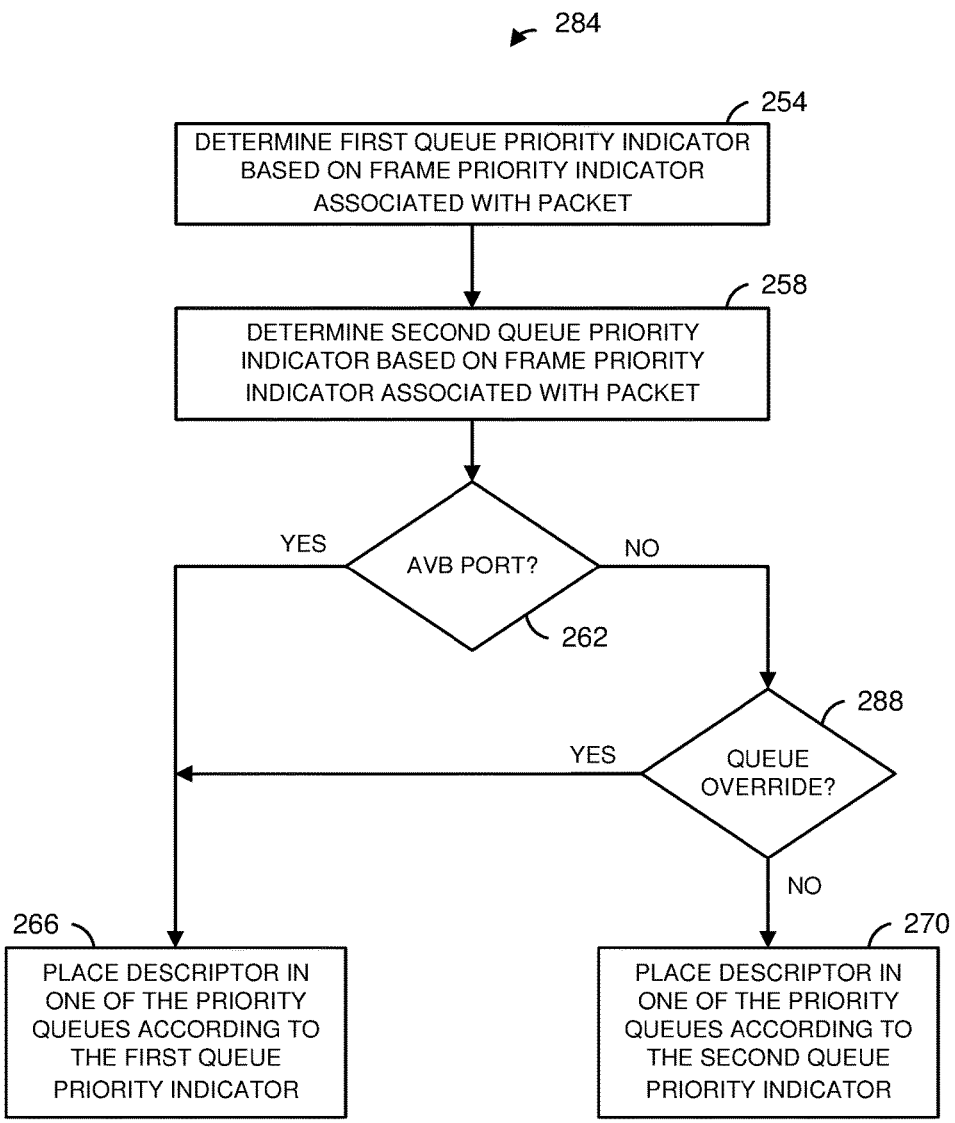
FIG. 4 is a flow diagram of another example method for placing a packet descriptor in an appropriate priority queue for egress, according to another embodiment.

FIG. 4 is a flow diagram of another example method 284 for placing a packet descriptor in an appropriate priority queue for egress, according to an embodiment. The method 284 is implemented by the enhanced AVB switch 108 (FIG. 1), in an embodiment. In other embodiments, the method 284 is implemented by another suitable switch device. The method 284 is similar to the method 250 of FIG. 250, and like-numbered blocks are not discussed for brevity.

If it is determined at block 262 that the port 112 via which the packet is to egress is coupled to a non-AVB device, the flow proceeds to block 288. At block 288, it is determined whether the queue priority override field for the port 112 is set to the first value which indicates that the descriptor should placed into an appropriate priority queue based on the first queue priority indicator. If it is determined that the queue priority override field is set to the first value, the flow proceeds to block 266 at which the descriptor is placed into an appropriate priority queue based on the first queue priority indicator.

On the other hand, if it is determined at block 288 that the queue priority override field for the port 112 is set to the second value which indicates that the descriptor should placed into an appropriate priority queue based on the second queue priority indicator, the flow proceeds to block 270. At block 270, the descriptor is placed into an appropriate priority queue based on the second queue priority indicator.

Figure 5:
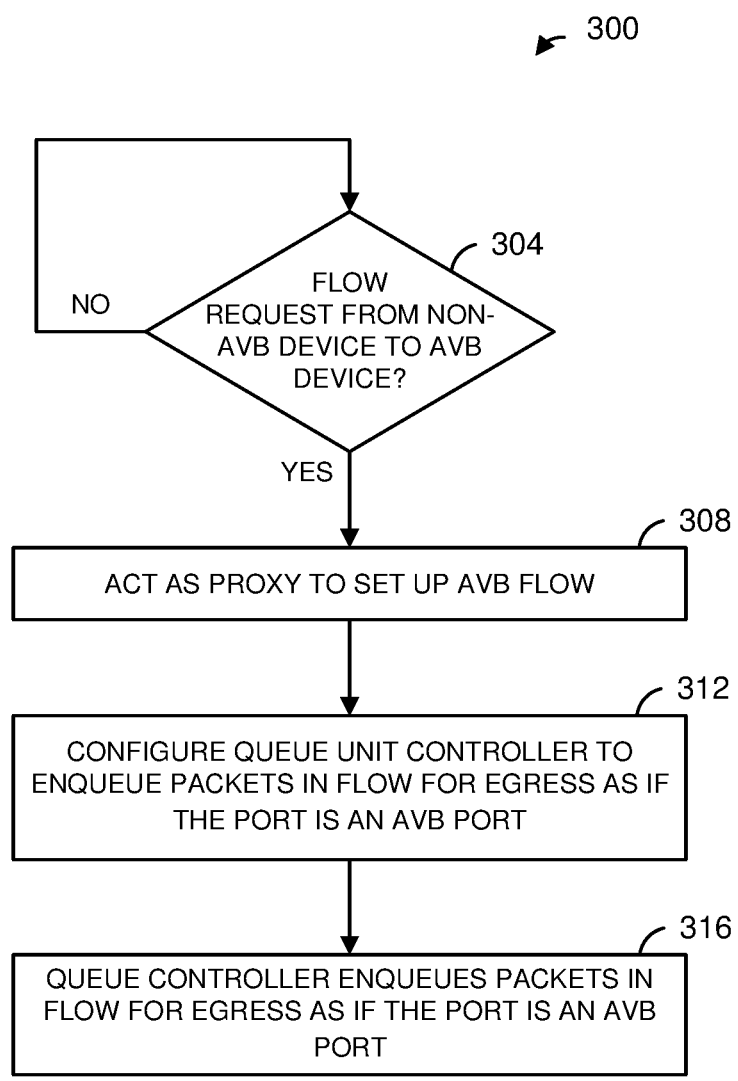
FIG. 5 is a flow diagram of an example method for delivering an AVB flow to a non-AVB device, according to an embodiment.

The method 284 of FIG. 4, or another suitable method, is utilized to enable AVB traffic to exit a non-AVB port 212, in an embodiment, which enables a non-AVB device to receive an AVB flow. FIG. 5 is a flow diagram of an example method 300 for delivering an AVB flow to a non-AVB device, according to an embodiment. The method 300 is implemented by the enhanced AVB switch 108 (FIG. 1), in an embodiment, and the method 300 is described with respect to FIGS. 1 and 2 for ease of explanation. In other embodiments, the method 300 is implemented by another suitable switch device.

At block 304, the enhanced AVB switch 108 detects a request from a non-AVB device 112 for a flow, where the request is directed to an AVB device. In an embodiment, the block 304 is implemented by the controller 120 and the forwarding engine 124. For example, in an embodiment, the forwarding engine 124 mirrors or forwards to the controller 120 packets that ingress on a non-AVB port 112 and egress or would otherwise egress on an AVB port 112, and the controller 120 analyzes the mirrored/forwarded packets to detect a request for a flow, e.g., a request for a video stream, a request for an audio stream, a message related to setting up a voice over IP (VoIP) session, etc.

If a request from a non-AVB device 112 for a flow, where the request is directed to an AVB device, is detected, the flow proceeds to block 308. At block 308, the enhanced AVB switch 108 acts as a proxy for the non-AVB device 104 to set up an AVB flow with the AVB device to which the request for the flow was sent. In an embodiment, the block 308 is implemented by the controller 120. For example, in an embodiment, the controller 120 exchanges messages with the AVB device 104 to set up the AVB flow on behalf of the non-AVB device 104.

At block 312, the enhanced AVB switch 108 configures the queue controller 128 so that the egress queue unit 204 corresponding to the port 112 to which the non-AVB device 104 is coupled enqueues packets in the flow for egress as if the port 112 is an AVB port. For example, in an embodiment, the controller 120 configures the queue controller 128 and/or the port 112 coupled to the non-AVB device to set the queue priority override field (discussed above with respect to FIG. 4) for the port 112 coupled to the non-AVB device to the first value. As discussed above, setting the queue priority override field to the first value indicates that descriptors forwarded to the port 112 coupled to the non-AVB device should be placed into an appropriate priority queue based on the first queue priority indicator. Also as discussed above, the first queue priority indicator indicates the particular priority queue 208 in which the packet descriptor should be placed when the egress port 112 is coupled to an AVB device.

At block 316, the queue controller 128 enqueues packets in the flow for egress as if the port 112 is an AVB port. For example, in an embodiment, the queue controller 128 implements the method 284 of FIG. 4. In other embodiments, the queue controller 128 implements another suitable method to enqueue packets in the flow for egress as if the port 112 is an AVB port.

The AVB Standards have reserved certain IEEE 802.1p Standard PCP field values for use in handling AVB packets. The PCP field is included in an IEEE 802.1Q tag in a header of a packet. For example, the PCP field value 3 is reserved for AVB high priority packets (as a default), and the PCP field value 2 is reserved for AVB low priority packets (as a default). According to the AVB Standards, non-AVB packets should not utilize the reserved PCP field values (e.g., values 2 and 3, as defaults) so that AVB-enabled network devices can distinguish AVB packets from non-AVB packets by simply examining the PCP field. As discussed above, a switch device can be configured so that a PCP field value other than 3 is reserved for AVB high priority packets, and a PCP field value other than 2 is reserved for AVB low priority packets.

Referring again to FIG. 1, in an embodiment, each port 112 includes the header modifier unit 150 as discussed above. In an embodiment, the header modifier unit 150 determines whether to modify a header of a packet on egress so that non-AVB packets do not utilize the PCP field values reserved by the AVB Standards when egressing from an AVB port 112. The header modifier unit 150 modifies the header of a packet on egress when appropriate.

Figure 6:
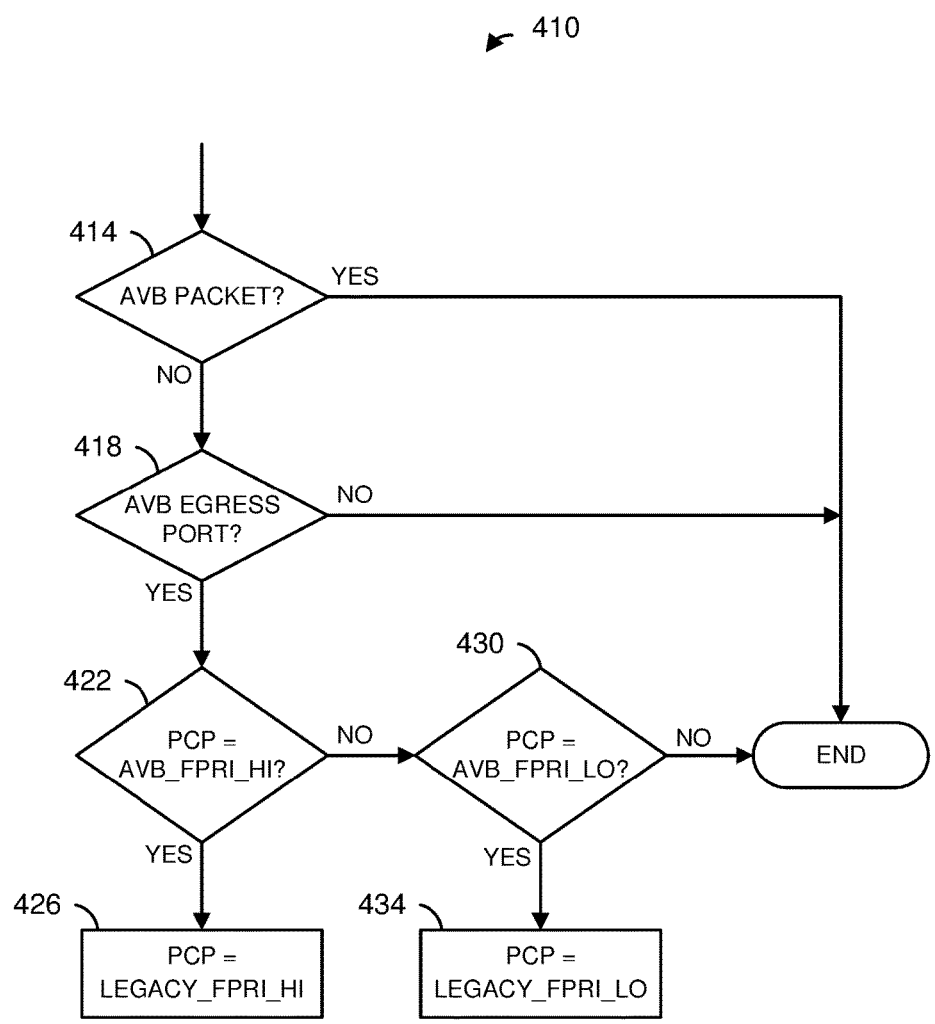
FIG. 6 is a flow diagram of an example method for determining whether to modify a header of a packet on egress, and modifying the header when appropriate on egress, according to an embodiment.

FIG. 6 is a flow diagram of an example method 410 for determining whether to modify a header of a packet on egress, and modifying the header when appropriate on egress so that non-AVB packets do not utilize the PCP field values reserved for AVB packets when egressing from an AVB port, according to an embodiment. In an embodiment, the method 410 is implemented by the header modifier unit 150 (FIG. 1). In other embodiments, the method 410 is implemented additionally or alternatively by other suitable components of the enhanced-AVB switch. The method 410 is described with reference to FIG. 1 for ease of explanation. In some embodiments, however, the method 410 is implemented by a suitable network device other than the switch 108 of FIG. 1.

At block 414, it is determined whether a packet to be egressed is an AVB packet. Determining whether a packet is an AVB packet is implemented using any of a variety of suitable techniques. For example, in an embodiment, an ingress processing unit 116 of a port 112 that receives the packet examines a PCP field of the packet to determine whether a value of the PCP field is one of the values reserved for AVB packets. If the ingress port 112 is an AVB port and the PCP field is one of the values reserved for AVB packets, the ingress processing unit 116 determines that the packet is an AVB packet. The ingress processing unit 116 then sets an AVB field associated with the packet to a value indicating the packet is an AVB packet. When the packet is handled by the egress processing unit of a port 112 that is to egress the packet, the egress processing unit 118 determines whether the packet is an AVB packet by examine the AVB field associated with the packet. In another embodiment, when the packet is handled by the egress processing unit 118, the egress processing unit 118 determines whether the packet is an AVB packet by determining whether the packet was received via an AVB port 112 and by examining the PCP field of the packet. In an embodiment, the AVB field is included in the packet descriptor associated with the packet. In another embodiment, the AVB field is stored in the shared memory 132 at a location associated with the packet. In another embodiment, the AVB field is stored in a suitable memory storage device and associated with the packet and accessible by the egress processing unit 118.

If it is determined that the packet is an AVB packet, the method 410 ends. On the other hand, if it is determined that the packet is not an AVB packet, the flow proceeds to block 418. At block 418, it is determined whether the egress port 112 is an AVB port (e.g., is coupled to an AVB-enabled device). Determining whether the egress port 112 is an AVB port is implemented using any of a variety of suitable techniques. For example, in an embodiment, the egress port 112 exchanges messages with the device 104 coupled to the egress port 112 and follows a protocol specified by the AVB Standards to determine whether the device 104 is an AVB enabled device.

If it is determined that the port is not an AVB port, the method 410 ends. In other words, when a packet is not an AVB packet and when the packet egresses via a non-AVB port, the PCP field of the packet is not modified by the enhanced AVB switch 108.

On the other hand, if it is determined that the egress port 112 is an AVB port, the flow proceeds to block 422. At block 422, it is determined whether a value of the PCP field of the packet is set to a first value reserved for AVB packets (e.g., a reserved value corresponding to AVB high priority, e.g., 3).

In an embodiment, block 422 includes examining a variable FPRI that indicates the value of the PCP field of the packet. In an embodiment, the variable FPRI is included in the packet descriptor corresponding to the packet and provided to the egress port 112. In another embodiment, the variable FPRI is stored in the shared memory 132 and associated with the packet. In another embodiment, block 422 includes examining the header of the packet stored in the shared memory 132.

If it is determined that the value of the PCP field of the packet is set to the first value reserved for AVB packets, the flow proceeds to block 426. At block 426, the PCP field of the packet is modified to a first non-reserved value (e.g., a non-reserved value corresponding to high priority (LEGACY_FPRI_HI), e.g., not 2 or 3). In an embodiment, block 426 includes setting the value of FPRI to the first non-reserved value, and setting the PCP field of the packet stored in the shared memory 132 to the value of FPRI. In another embodiment, block 426 omits setting the value of a variable such as FPRI and merely includes setting the value of the PCP field of the packet stored in the shared memory 132 to the first non-reserved value.

On the other hand, if it is determined at block 422 that the value of the PCP field of the packet is not set to the first value reserved for AVB packets, the flow proceeds to block 430. At block 430, it is determined whether a value of the PCP field of the packet is set to a second value reserved for AVB packets (e.g., a reserved value corresponding to AVB low priority, e.g., 2). If it is determined that the value of the PCP field of the packet is not set to the second value reserved for AVB packets, the flow ends.

On the other hand, if it is it is determined at block 430 that the value of the PCP field of the packet is set to the second value reserved for AVB packets, the flow proceeds to block 434. At block 434, the PCP field of the packet is modified to a second non-reserved value (e.g., a non-reserved value corresponding to low priority (LEGACY_FPRI_LO), e.g., not 2 or 3). In an embodiment, block 434 includes setting the value of FPRI to the second non-reserved value, and setting the PCP field of the packet stored in the shared memory 132 to the value of FPRI. In another embodiment, block 434 omits setting the value of a variable such as FPRI and merely includes setting the value of the PCP field of the packet stored in the shared memory 132 to the second non-reserved value.

Referring again to FIG. 1, in an embodiment, the enhanced AVB switch 108 is configured to enqueue non-AVB packets as if they are AVB packets. In an embodiment, the forwarding database 126 includes information that indicates, for a packet with a given combination of header information (e.g., a given combination of one or more of a destination address (DA), a source address (SA), a VLAN tag, etc.), whether packets corresponding to the given combination are to be enqueued as if AVB packets.

Figure 7:
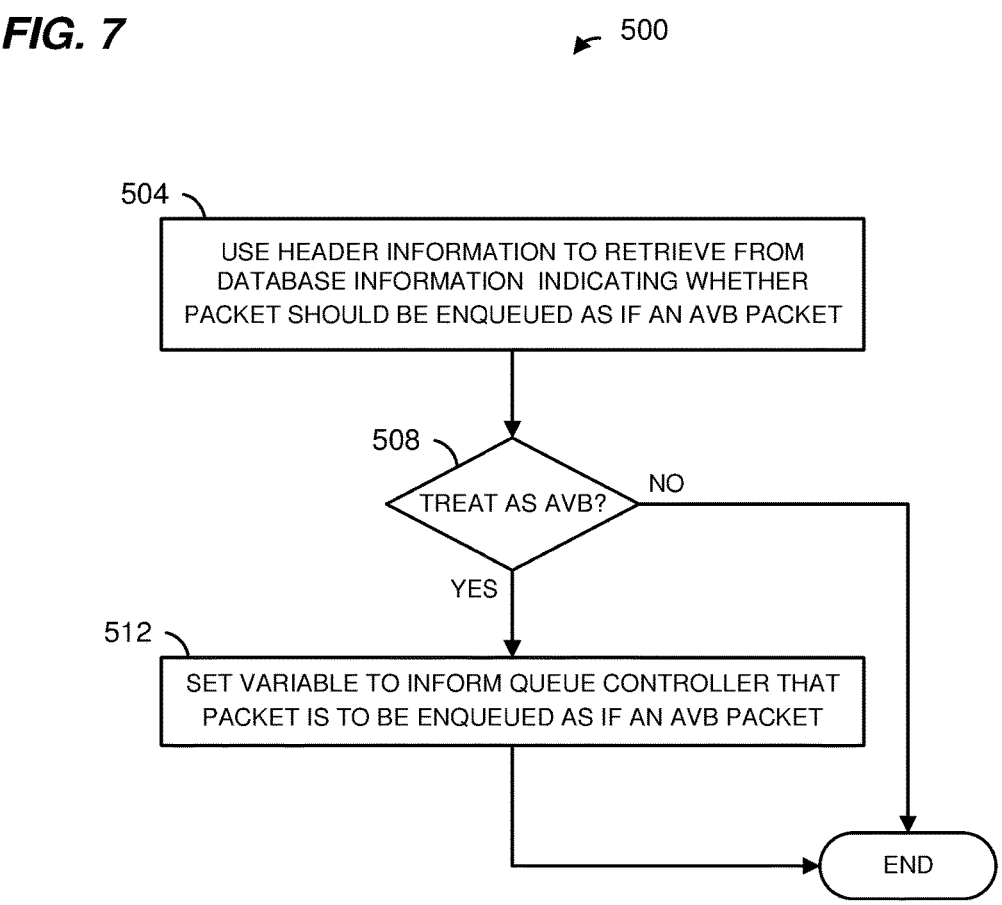
FIG. 7 is a flow diagram of an example method for processing non-AVB packets in a network device to enqueue the non-AVB packets as if AVB packets, according to an embodiment.

FIG. 7 is a flow diagram of an example method 500 for processing non-AVB packets in a network device to enqueue the non-AVB packets as if AVB packets, according to an embodiment. In an embodiment, the method 500 is implemented by the enhanced AVB switch 108 (FIG. 1), and the method 500 is described with reference to FIG. 1 for ease of explanation. In an embodiment, the method 500 is implemented at a non-AVB port 112. In some embodiments, however, the method 500 is implemented by a suitable network device other than the enhanced AVB switch 108 of FIG. 1.

At block 504, header information for the packet is utilized to retrieve from a database information indicating whether the packet should be enqueued as if an AVB packet. In an embodiment, the ingress processing unit 116 interfaces with the forwarding engine 124 to retrieve information from the forwarding database 126 that indicates whether a particular packet should be enqueued as if an AVB packet. The forwarding database 126 associates particular DAs with indications whether a packet having the DA in the header should be enqueued as if an AVB packet, in an embodiment. In an embodiment, the forwarding database 126 associates particular DA/SA pairs with indications whether a packet having the DA/SA pair in the header should be enqueued as if an AVB packet, in an embodiment. In other embodiments, the forwarding database 126 associates other combinations of information in a packet header to an indication of whether a packet having the combination of header information should be enqueued as if an AVB packet. The indication of whether a packet having the combination of header information should be enqueued as if an AVB packet is a field of a database entry associated with the combination of header information, in an embodiment.

At block 508, it is determined whether the information retrieved at block 504 indicates that the packet should be enqueued as if an AVB packet. If the packet is not to be enqueued as if an AVB packet, the flow ends.

On the other hand, if it is determined at block 508 that the packet is to be enqueued as if an AVB packet, the flow proceeds to block 512. At block 512, a variable is set to indicate to the queue controller 128 that the packet is to be enqueued as if an AVB packet. In an embodiment, the variable indicates to the egress queue unit 204 associated with an AVB port 112 via which the packet is to egress that the packet is to be enqueued as if an AVB packet. The variable is stored the packet descriptor associated with the packet, in an embodiment. In another embodiment, the variable is stored in the shared memory 132 at a location associated with the packet. In another embodiment, the variable is stored in a suitable memory storage device and associated with the packet and accessible by the queue controller 128. In an embodiment, the variable is the AVB field discussed above with respect to FIG. 6. In another embodiment, the variable is different than the AVB field discussed above with respect to FIG. 6. In an embodiment, the variable is utilized to modify the AVB field.

Referring now to FIGS. 6 and 7, in an embodiment, if the variable set at block 512 of FIG. 7 is different than the AVB field discussed with respect to FIG. 6 or the AVB field is not modified in response to block 512, block 414 of FIG. 6 includes examining the variable set at block 512 to determine if the packet is an AVB packet, in an embodiment.

FIG. 8 is a flow diagram of another example method 550 for processing non-AVB packets in a network device to enqueue the non-AVB packets as if AVB packets, according to an embodiment. In an embodiment, the method 550 is implemented by the enhanced AVB switch 108 (FIG. 1), and the method 550 is described with reference to FIG. 1 for ease of explanation. In an embodiment, the method 550 is implemented at least partially by a non-AVB port 112. In an embodiment, the method 550 is implemented by a non-AVB port 112 (ingress) and an AVB port 112 (egress). In some embodiments, however, the method 550 is implemented by a suitable network device other than the enhanced AVB switch 108 of FIG. 1.

At block 554, header information for the packet is utilized to retrieve from a database information indicating whether the packet should be enqueued as if an AVB packet. In an embodiment, the ingress processing unit 116 interfaces with the forwarding engine 124 to retrieve information from the forwarding database 126 that indicates whether a particular packet should be enqueued as if an AVB packet. The forwarding database 126 associates particular DAs with indications whether a packet having the DA in the header should be enqueued as if an AVB packet, in an embodiment. In an embodiment, the forwarding database 126 associates particular DA/SA pairs with indications whether a packet having the DA/SA pair in the header should be enqueued as if an AVB packet, in an embodiment. In other embodiments, the forwarding database 126 associates other combinations of information in a packet header to an indication of whether a packet having the combination of header information should be enqueued as if an AVB packet. The indication of whether a packet having the combination of header information should be enqueued as if an AVB packet is a field of a database entry associated with the combination of header information, in an embodiment.

Additionally, header information for the packet is utilized to retrieve from the database information indicating whether the priority indicator information in the header (e.g., the PCP field) can be modified. In an embodiment, the header information for the packet is also utilized to retrieve from the database an override value for the priority indicator information in the header.

At block 558, it is determined whether the information retrieved at block 554 indicates that the packet should be enqueued as if an AVB packet. If the packet is not to be enqueued as if an AVB packet, the flow ends.

On the other hand, if it is determined at block 558 that the packet is to be enqueued as if an AVB packet, the flow proceeds to block 562. At block 562, it is determined whether the information retrieved at block 554 indicates that the packet priority indicator information in the header can be modified. If the priority indicator information in the header cannot be modified, the flow ends.

On the other hand, if it is determined at block 562 that the packet priority indicator information in the header can be modified, the flow proceeds to block 562. At block 566, a variable is set to indicate to the queue controller 128 that the packet is to be enqueued as if an AVB packet similar to the block 512 of FIG. 7.

At block 570, the packet priority indicator information in the header is modified using the override value retrieved at block 554. In an embodiment, the ingress processing unit 116 of the ingress port implements block 570. In an embodiment, the ingress processing unit 116 of the ingress port and the egress processing unit of the egress port implement block 570. For example, in an embodiment, the ingress processing unit 116 of the ingress port provides information to the egress processing unit 118 of the egress port informing the egress port to modify the header (using the header modifier unit 150) and specifying or indicating the override value. In an embodiment, the information provided by the ingress processing unit 116 to the egress processing unit is provided in the packet descriptor or using another suitable mechanism, such as via the shared memory 132.

Referring to FIGS. 3 and 8, if blocks 254 and 258 are performed prior to performing block 570, blocks 254 and 258, or similar blocks, are re-performed in response to performing block 570.

In an embodiment, the method of FIG. 7 is modified to permit enqueuing a non-AVB packet as an AVB packet (AVB override) only if the ingress port is enabled for AVB override. FIG. 9 is a flow diagram of another example method 600 for processing non-AVB packets in a network device to enqueue the non-AVB packets as if AVB packets, according to an embodiment. In an embodiment, the method 600 is implemented by the enhanced AVB switch 108 (FIG. 1), and the method 600 is described with reference to FIG. 1 for ease of explanation. In an embodiment, the method 600 is implemented at least partially by a non-AVB port 112. In an embodiment, the method 600 is implemented by a non-AVB port 112 (ingress) and an AVB port 112 (egress). In some embodiments, however, the method 600 is implemented by a suitable network device other than the enhanced AVB switch 108 of FIG. 1.

At block 604, header information for the packet is utilized to retrieve from a database information indicating whether the packet should be enqueued as if an AVB packet. In an embodiment, the ingress processing unit 116 interfaces with the forwarding engine 124 to retrieve information from the forwarding database 126 that indicates whether a particular packet should be enqueued as if an AVB packet. The forwarding database 126 associates particular DAs with indications whether a packet having the DA in the header should be enqueued as if an AVB packet, in an embodiment. In an embodiment, the forwarding database 126 associates particular DA/SA pairs with indications whether a packet having the DA/SA pair in the header should be enqueued as if an AVB packet, in an embodiment. In other embodiments, the forwarding database 126 associates other combinations of information in a packet header to an indication of whether a packet having the combination of header information should be enqueued as if an AVB packet. The indication of whether a packet having the combination of header information should be enqueued as if an AVB packet is a field of a database entry associated with the combination of header information, in an embodiment.

Additionally, information for the packet is utilized to retrieve from the database information indicating which ports 112 are enabled to permit designating a non-AVB packet an AVB packet (AVB override). The forwarding database 126 associates particular DAs with indications of the ports 112 that are enabled to perform an AVB override with respect to those DAs, in an embodiment.

At block 608, it is determined whether the information retrieved at block 604 indicates that the packet should be enqueued as if an AVB packet. If the packet is not to be enqueued as if an AVB packet, the flow ends.

On the other hand, if it is determined at block 608 that the packet is to be enqueued as if an AVB packet, the flow proceeds to block 612. At block 612, it is determined whether the information retrieved at block 604 indicates that the ingress port 112 is permitted to perform an AVB override. For example, the information retrieved at block 604 that indicates the port(s) 112 that are enabled to perform an AVB override with respect to the DA of the packet is analyzed to determine if AVB override is permitted at the port via which the packet ingressed. If the port 112 is not permitted to perform an AVB override, the flow ends.

On the other hand, if it is determined at block 612 that the packet priority indicator information in the header can be modified, the flow proceeds to block 616. At block 616, a variable is set to indicate to the queue controller 128 that the packet is to be enqueued as if an AVB packet similar to the block 512 of FIG. 7.

In another embodiment, configuration information for a port indicates whether packets egressing from the port should be treated as AVB packets even when the port is not coupled to an AVB device. In an embodiment, this configuration information is utilized to determine whether a packet should be enqueued as if an AVB packet when egressing a non-AVB port.

In an embodiment, the method of FIG. 8 is modified to permit enqueuing a non-AVB packet as an AVB packet (AVB override) only if the ingress port is enabled for AVB override similar to the method 600 of FIG. 9.

In other embodiments, information regarding whether an ingress port is permitted to perform an AVB override is stored in a register or other suitable storage device associated with the port.

Figure 10:
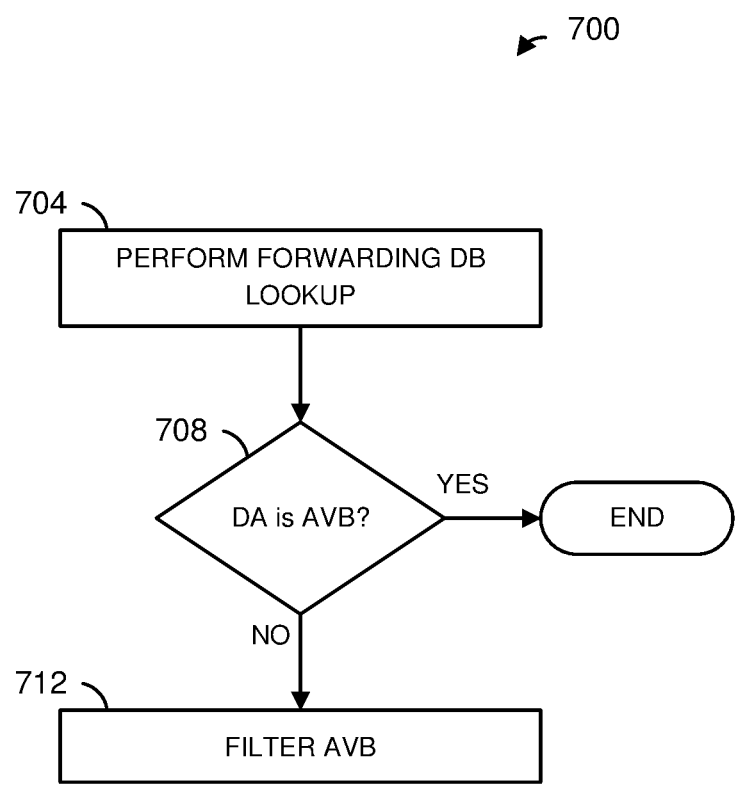
FIG. 10 is a flow diagram of an example method for processing a packet in a network device, according to another embodiment.

FIG. 10 is a flow diagram of an example method 700 for processing packets in a network device, according to an embodiment. In an embodiment, the method 700 is implemented by the enhanced AVB switch 108 (FIG. 1), and the method 700 is described with reference to FIG. 1 for ease of explanation. In an embodiment, the method 700 is implemented at least partially by a port 112. In some embodiments, however, the method 700 is implemented by a suitable network device other than the enhanced AVB switch 108 of FIG. 1.

In the method 700, it is assumed that the packet being processed has a frame priority indicator corresponding to an AVB value. For example, it is assumed that the packet being processed has an IEEE 802.1Q PCP field value of 2 or 3, in an embodiment.

At block 704, a forwarding database lookup is performed. In an embodiment, the forwarding engine 124 performs a lookup in the database 126 using header information of the packet.

In an embodiment, the forwarding database 126 includes information that indicates, for packets with a given combination of header information (e.g., a given combination of one or more of a destination address (DA), a source address (SA), a VLAN tag, etc.), whether packets corresponding to the given combination are permitted to be treated as AVB packets. In an embodiment, the forwarding database 126 includes information that indicates, for packets with a particular DA, whether packets having the DA are permitted to be treated as AVB packets. For example, certain DAs in the forwarding database 126 may be flagged with an AVB Entry State value that indicates packets with the certain DAs are to be treated as AVB packets, according to an embodiment. Additionally, a DA in the forwarding database 126 flagged with an AVB Entry State value may also be associated with a particular input port so that packets with the DA will be considered as an AVB flow only if they are received via the particular input port, according to an embodiment.

In other embodiments, the database is not a forwarding database. For example, the database stores information that indicates which DAs (or which combinations of header information) are associated with AVB packets. For example, certain DAs in the database 126 may be flagged with an AVB Entry State value that indicates packets with the certain DAs are to be treated as AVB packets, according to an embodiment. Additionally, a DA in the database 126 flagged with an AVB Entry State value may also be associated with a particular input port so that packets with the DA will be considered as an AVB flow only if they are received via the particular input port, according to an embodiment.

At block 708, it is determined whether the packet is to be treated as an AVB packet based on information obtained at block 704. If it is determined that the packet is to be treated as an AVB packet, the flow ends. In an embodiment, it is determined that the packet is to be treated as an AVB packet when the destination address of the packet is in the database 126 and flagged with an AVB Entry State value. In another embodiment, it is determined that the packet is to be treated as an AVB packet when i) the destination address of the packet is in the database 126, ii) the destination address of the packet is flagged with an AVB Entry State value, and iii) the packet was received via an input port that corresponds to an input port indicated in the database 126 as being associated with the destination address.

On the other hand, if it is determined at block 708 that the packet is not to be treated as an AVB packet, the flow proceeds to block 712, at which the packet is filtered. In an embodiment, it is determined that the packet is not to be treated as an AVB packet when the destination address of the packet is not in the database 126 or is present in the database without the AVB Entry State value. In another embodiment, it is determined that the packet is to be treated as an AVB packet when i) the destination address of the packet is not in the database 126, ii) the destination address of the packet is not flagged with an AVB Entry State value, or iii) the packet was received via an input port that does not correspond to an input port indicated in the database 126 as being associated with the destination address.

In an embodiment, block 712 includes preventing the packet from egressing via any AVB ports according to the AVB protocol, but allowing the packet to egress via non-AVB ports, when appropriate, and thus preventing the packet from being transmitted according to the AVB protocol. For example, if the packet is a multicast packet or is to be flooded, the packet is only permitted to egress non-AVB ports. In another embodiment, block 712 includes allowing the packet to egress one or more AVB ports after modifying a header of the packet to change the frame priority indicator to a non-AVB value, and allowing the packet to egress via non-AVB ports, and thus preventing the packet from being transmitted according to the AVB protocol. For example, the IEEE 802.1Q PCP field value of the packet is changed to a value other than 2 or 3, in an embodiment.

In another embodiment, block 712 includes preventing the packet from egressing via any ports, including both AVB ports and non-AVB ports (e.g., discarding the packet).

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method implemented by a network device that supports an audio video bridging (AVB) communication protocol, the method comprising:
   receiving, at a first port of the network device, a frame having (i) a header with a destination address and (ii) a frame priority indicator;
   determining, at the network device, that the frame priority indicator has, when the frame was received at the first port, a value flagging the frame as to be handled by the network device according to the AVB communication protocol;
   performing, at the network device, a lookup in a database that includes network addresses, including determining whether the destination address in the header of the frame is included in the database;
   when the network device determines that the destination address in the header of the frame is not included in the database, preventing the frame from being transmitted by any port of the network device according to the AVB communication protocol, including either (i) dropping, at the network device, the frame so that the frame is not transmitted by any port of the network device, or (ii) transmitting, by the network device, the frame only from a first set of one or more ports of the network device according to a communication protocol that is different than the AVB communication protocol; and
   when the network device determines, based on the lookup in the database, that the frame is permitted to be transmitted by the network device according to the AVB communication protocol, transmitting, by the network device, the frame from a second set of one or more ports of the network device according to the AVB communication protocol.

2. The method of claim 1, wherein:
   the database further includes respective information that indicates, for multiple respective network addresses in the database, whether frames including the multiple network addresses are permitted to be transmitted by the network device according to the AVB communication protocol; and
   the method further comprises
      when the network device determines that the destination address in the header of the frame is included in the database, determining whether the database includes information that indicates that frames including the destination address in the header of the frame are permitted to be transmitted by the network device according to the AVB communication protocol, and
      when the network device determines that (i) the destination address in the header of the frame is included in the database, and (ii) the database does not include information that indicates that frames including the destination address in the header of the frame are permitted to be transmitted by the network device according to the AVB communication protocol, preventing the frame from being transmitted by any port of the network device according to the AVB communication protocol, including either (i) dropping, at the network device, the frame so that the frame is not transmitted by any port of the network device, or (ii) transmitting, by the network device, the frame only from one or more ports among the second set of one or more ports of the network device according to a communication protocol that is different than the AVB communication protocol.

3. The method of claim 2, further comprising:
   when the network device determines that (i) the destination address in the header of the frame is included in the database, and (ii) the database includes information that indicates that frames including the destination address in the header of the frame are permitted to be transmitted by the network device according to the AVB communication protocol, transmitting, by the network device, the frame from the second set of one or more ports of the network device according to the AVB communication protocol.

4. The method of claim 2, wherein:
   the database further includes respective information that indicates, for multiple respective network addresses in the database, allowed input ports that respectively correspond with the multiple network addresses to indicate that frames with destination addresses from among the multiple network addresses in the database are allowed to be transmitted via the AVB protocol only when the frames are received via the respective allowed input ports; and
   the method further comprises
      when the network device determines that (i) the destination address in the header of the frame is included in the database, and (ii) the database includes information that indicates that frames including the destination address in the header of the frame are permitted to be transmitted by the network device according to the AVB communication protocol, determining whether the database includes information that indicates that the first port is an allowed input port that corresponds to the destination address in the header of the frame, and
      when the network device determines that (i) the destination address in the header of the frame is included in the database, (ii) the database includes information that indicates that frames including the destination address in the header of the frame are permitted to be transmitted by the network device according to the AVB communication protocol, and (iii) the first port is not an allowed input port that corresponds to the destination address in the header of the frame, preventing the frame from being transmitted by any port of the network device according to the AVB communication protocol, including either (i) dropping, at the network device, the frame so that the frame is not transmitted by any port of the network device, or (ii) transmitting, by the network device, the frame only from one or more ports among the second set of one or more ports of the network device according to a communication protocol that is different than the AVB communication protocol.

5. The method of claim 4, wherein:
when the network device determines that (i) the destination address in the header of the frame is included in the database, (ii) the database includes information that indicates that frames including the destination address in the header of the frame are permitted to be transmitted by the network device according to the AVB communication protocol, and (iii) the first port is an allowed input port that corresponds to the destination address in the header of the frame, transmitting, by the network device, the frame from the second set of one or more ports of the network device according to the AVB communication protocol.

6. The method of claim 1, wherein:
the database further includes respective information that indicates, for multiple respective network addresses in the database, allowed input ports that respectively correspond with the multiple network addresses to indicate that frames with destination addresses from among the multiple network addresses in the database are allowed to be transmitted via the AVB protocol only when the frames are received via the respective allowed input ports; and
the method further comprises
when the network device determines that the destination address in the header of the frame is included in the database, determining whether the database includes information that indicates that the first port is an allowed input port that corresponds to the destination address in the header of the frame, and
when the network device determines that (i) the destination address in the header of the frame is included in the database, and (ii) the first port is not an allowed input port that corresponds to the destination address in the header of the frame, preventing the frame from being transmitted by any port of the network device according to the AVB communication protocol, including either (i) dropping, at the network device, the frame so that the frame is not transmitted by any port of the network device, or (ii) transmitting, by the network device, the frame only from one or more ports among the second set of one or more ports of the network device according to a communication protocol that is different than the AVB communication protocol.

7. The method of claim 6, wherein:
when the network device determines that (i) the destination address in the header of the frame is included in the database, and (ii) the first port is an allowed input port that corresponds to the destination address in the header of the frame, transmitting, by the network device, the frame from the second set of one or more ports of the network device according to the AVB communication protocol.

8. The method of claim 1, wherein:
the database is a forwarding database that includes forwarding information regarding respective associations between ports of the network device and network addresses; and
the method further comprises determining, based on performing the lookup in the forwarding database, the first set of one or more ports or the second set of one or more ports.

9. The method of claim 1, wherein the first set of one or more ports includes only one or more ports that are not configured to handle frames according to the AVB communication protocol.

10. The method of claim 1, wherein the frame priority indicator is an Institute for Electrical and Electronics Engineers (IEEE) 802.1p priority code point (PCP) field of an IEEE 802.1Q Standard VLAN tag in the header of the frame.

11. The method of claim 10, wherein the value flagging the frame as to be handled by the network device according to the AVB communication protocol is a value of 2 or 3.

12. The method of claim 1, wherein:
for each of at least some of the ports of the network device, the network device includes (i) one or more first egress queues reserved for frames that are to be transmitted according to the AVB communication protocol, and (i) one or more second egress queues that are not reserved for frames that are to be transmitted according to the AVB communication protocol; and
the method further comprises
when the network device determines that the destination address in the header of the frame is not included in the database, enqueuing the frame only in one or more second egress queues associated with one or more ports among the first set of one or more ports.

13. A network device that supports an audio video bridging (AVB) communication protocol, the network device comprising:
one or more integrated circuit devices;
a database implemented on the one or more integrated circuit devices, the database including network addresses; and
a lookup engine implemented on the one or more integrated circuit devices, the lookup engine coupled to, or including, the database, wherein the lookup engine is configured to
perform lookups in the forwarding database using header information of frames received by the network to device, including performing a lookup in connection with a frame received at a first port of the network device, and determining whether a destination address in a header of the frame is included in the database;
wherein the one or more integrated circuit devices are configured to
determine that a frame priority indicator in a header of a frame received at a first port of the network device has, when the frame was received at the first port, a value flagging the frame as to be handled by the network device according to the AVB communication protocol,
when the lookup engine determines that the destination address in the header of the frame is not included in the database, prevent the frame from being transmitted by any port of the network device according to the AVB communication protocol, including either (i) dropping the frame so that the frame is not transmitted by any port of the network device, or (ii) transmitting the frame only from a first set of one or more ports of the network device according to a communication protocol that is different than the AVB communication protocol, and
when the one or more integrated circuit devices determine, based on the lookup in the database, that the frame is permitted to be transmitted by the network device according to the AVB communication protocol, transmit the frame from a second set of one or more ports of the network device according to the AVB communication protocol.

14. The network device of claim 13, wherein:

the database further includes respective information that indicates, for multiple respective network addresses in the database, whether frames including the multiple network addresses are permitted to be transmitted by the network device according to the AVB communication protocol; and the one or more integrated circuit devices are configured to when the lookup engine determines that the destination address in the header of the frame is included in the database, determine whether the database includes information that indicates that frames including the destination address in the header of the frame are permitted to be transmitted by the network device according to the AVB communication protocol, and when the one or more integrated circuit devices determine that (i) the destination address in the header of the frame is included in the database, and (ii) the database does not include information that indicates that frames including the destination address in the header of the frame are permitted to be transmitted by the network device according to the AVB communication protocol, prevent the frame from being transmitted by any port of the network device according to the AVB communication protocol, including either (i) dropping the frame so that the frame is not transmitted by any port of the network device, or (ii) transmitting the frame only from one or more ports among the second set of one or more ports of the network device according to a communication protocol that is different than the AVB communication protocol.

15. The network device of claim 14, wherein the one or more integrated circuit devices are further configured to:

when the one or more integrated circuit devices determine that (i) the destination address in the header of the frame is included in the database, and (ii) the database includes information that indicates that frames including the destination address in the header of the frame are permitted to be transmitted by the network device according to the AVB communication protocol, transmit the frame from the second set of one or more ports of the network device according to the AVB communication protocol.

16. The network device of claim 14, wherein:

the database further includes respective information that indicates, for multiple respective network addresses in the database, allowed input ports that respectively correspond with the multiple network addresses to indicate that frames with destination addresses from among the multiple network addresses in the database are allowed to be transmitted via the AVB protocol only when the frames are received via the respective allowed input ports; and the one or more integrated circuit devices are further configured to when the one or more integrated circuit devices determine that (i) the destination address in the header of the frame is included in the database, and (ii) the database includes information that indicates that frames including the destination address in the header of the frame are permitted to be transmitted by the network device according to the AVB communication protocol, determine whether the database includes information that indicates that the first port is an allowed input port that corresponds to the destination address in the header of the frame, and when the one or more integrated circuit devices determine that (i) the destination address in the header of the frame is included in the database, (ii) the database includes information that indicates that frames including the destination address in the header of the frame are permitted to be transmitted by the network device according to the AVB communication protocol, and (iii) the first port is not an allowed input port that corresponds to the destination address in the header of the frame, prevent the frame from being transmitted by any port of the network device according to the AVB communication protocol, including either (i) dropping the frame so that the frame is not transmitted by any port of the network device, or (ii) transmitting the frame only from one or more ports among the second set of one or more ports of the network device according to a communication protocol that is different than the AVB communication protocol.

17. The network device of claim 16, wherein the one or more integrated circuit devices are further configured to:

when the one or more integrated circuit devices determine that (i) the destination address in the header of the frame is included in the database, (ii) the database includes information that indicates that frames including the destination address in the header of the frame are permitted to be transmitted by the network device according to the AVB communication protocol, and (iii) the first port is an allowed input port that corresponds to the destination address in the header of the frame, transmit the frame from the second set of one or more ports of the network device according to the AVB communication protocol.

18. The network device of claim 13, wherein:

the database further includes respective information that indicates, for multiple respective network addresses in the database, allowed input ports that respectively correspond with the multiple network addresses to indicate that frames with destination addresses from among the multiple network addresses in the database are allowed to be transmitted via the AVB protocol only when the frames are received via the respective allowed input ports; and the one or more integrated circuit devices are further configured to when lookup engine determines that the destination address in the header of the frame is included in the database, determine whether the database includes information that indicates that the first port is an allowed input port that corresponds to the destination address in the header of the frame, and when the one or more integrated circuit devices determine that (i) the destination address in the header of the frame is included in the database, and (ii) the first port is not an allowed input port that corresponds to the destination address in the header of the frame, prevent the frame from being transmitted by any port of the network device according to the AVB communication protocol, including either (i) dropping the frame so that the frame is not transmitted by any port of the network device, or (ii) transmitting the frame only from one or more ports among the second set of one or more ports of the network device according to a communication protocol that is different than the AVB communication protocol.

19. The network device of claim 18, wherein one or more integrated circuit devices are further configured to:

when the one or more integrated circuit devices determine that (i) the destination address in the header of the frame is included in the database, and (ii) the first port is an allowed input port that corresponds to the destination address in the header of the frame, transmit the frame from the second set of one or more ports of the network device according to the AVB communication protocol.

20. The network device of claim 13, wherein:

the database is a forwarding database that includes forwarding information regarding respective associations between ports of the network device and network addresses; and the one or more integrated circuit devices are further configured to determine, based on the lookup in the forwarding database performed by the lookup engine, the first set of one or more ports or the second set of one or more ports.

21. The network device of claim 13, wherein the first set of one or more ports includes only one or more ports that are not configured to handle frames according to the AVB communication protocol.

22. The network device of claim 13, wherein the frame priority indicator is an Institute for Electrical and Electronics Engineers (IEEE) 802.1p priority code point (PCP) field of an IEEE 802.1Q Standard VLAN tag in the header of the frame.

23. The network device of claim 22, wherein the value flagging the frame as to be handled by the network device according to the AVB communication protocol is a value of 2 or 3.

24. The network device of claim 13, wherein:

for each of at least some of the ports of the network device, the network device includes (i) one or more first egress queues reserved for frames that are to be transmitted according to the AVB communication protocol, and (i) one or more second egress queues that are not reserved for frames that are to be transmitted according to the AVB communication protocol; and the one or more integrated circuit devices are further configured to:

when the network device determines that the destination address in the header of the frame is not included in the database, enqueue the frame only in one or more second egress queues associated with one or more ports among the first set of one or more ports.

* * * * *